United States Patent [19]

Bierhoff

[11] Patent Number: 4,813,031
[45] Date of Patent: * Mar. 14, 1989

[54] APPARATUS FOR REPRODUCING INFORMATION FROM AN OPTICALLY READABLE RECORD CARRIER

[75] Inventor: Martinus P. M. Bierhoff, Eindhoven, Netherlands

[73] Assignee: U.S. Philips Corp., New York, N.Y.

[*] Notice: The portion of the term of this patent subsequent to Dec. 9, 2003 has been disclaimed.

[21] Appl. No.: 589,386

[22] Filed: Mar. 14, 1984

[30] Foreign Application Priority Data

Oct. 17, 1983 [NL] Netherlands .......................... 8303564

[51] Int. Cl.⁴ .............................................. O11B 7/00
[52] U.S. Cl. ........................................ 369/45; 369/50; 250/201
[58] Field of Search .................... 369/44, 45, 46, 50; 250/201 DF, 202

[56] References Cited

U.S. PATENT DOCUMENTS 4,532,522  7/1985  Tsunoda et al. ................... 369/46 X
4,535,431  8/1985  Bricot et al. ..................... 250/202 X
4,550,394  10/1985 Maeda et al. ......................... 369/46
4,561,082  12/1985 Gérard et al. ..................... 369/46 X
4,628,497  12/1986 Bierhoff .............................. 369/44

FOREIGN PATENT DOCUMENTS 0138273  4/1985  European Pat. Off. .

Primary Examiner—Aristotelis M. Psitos
Attorney, Agent, or Firm—Thomas A. Briody; Leroy Eason

[57] ABSTRACT

An apparatus is described for reading an optically readable record carrier, in which apparatus various control signals are derived from signals obtained by sampling the signals supplied by two optical-detector halves with the bit frequency both during the intermediate areas and the pits, the samples taken during the pits being processed separately from the samples taken during the intermediate areas.

Preferably, only one sample is taken for each pit and each intermediate area, namely only if the pit or intermediate area is longer than a specific number of clock periods.

9 Claims, 5 Drawing Sheets

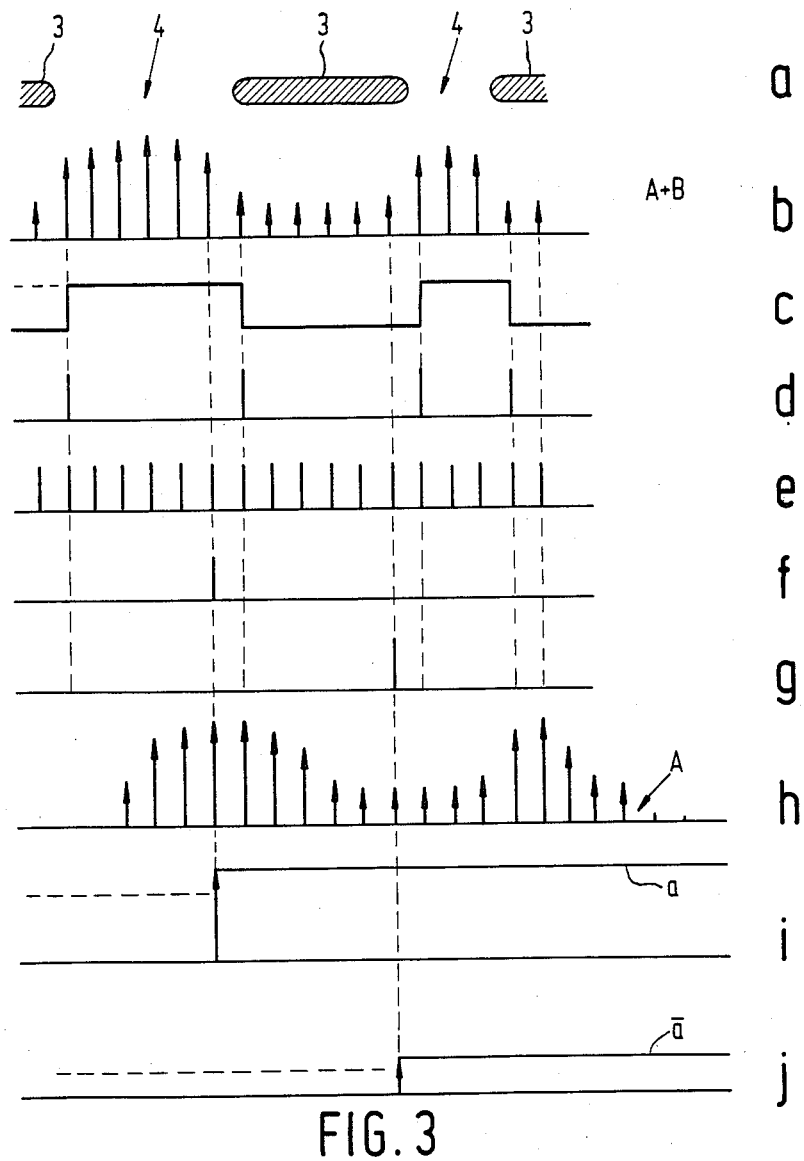

APPARATUS FOR REPRODUCING INFORMATION FROM AN OPTICALLY READABLE RECORD CARRIER

BACKGROUND OF THE INVENTION

1. Field of the Invention

The invention relates to an apparatus for reproducing information from an optically readable record carrier on which digital information is stored in the form of a track of optically detectable areas which alternate with intermediate areas, which apparatus comprises:

an optical system for projecting a light beam on the record carrier, at least two optical detectors which are so arranged in the beam which has been modulated by the record carrier that in the case of a correct tracking the two detectors are disposed symmetrically with respect to the image of the track, a signal-generating circuit for generating at least a first and a second detection signal as a function of the amounts of light detected by the optical detectors, and a control-signal generator for generating at least one signal which is a measure of the location of the spot produced by the light beam relative to the track.

2. Description of the Related Art

Such apparatus is known inter alia as the commercially available "Compact Disc Digital Audio" player which is described in "Philips Technical Review", Vol. 40, 1982, No. 6, the entire issue, which entire issue is herewith incorporated by reference, such a player being also described in, for example Japanese Patent Application No. 56-49094.

In the known apparatuses various control signals are derived in an analog manner from the digital signals originating from the disc, which control signals often exhibit a very low signal-to-noise ratio and often are also inaccurate because the control information is disturbed by the irregular data signal.

SUMMARY OF THE INVENTION

It is the object of the invention to improve the generation of the control signals in an apparatus of the type specified in the opening paragraph and to this end the invention is characterized by oscillator means for supplying a clock signal, an analog-to-digital converter which is clocked by the oscillator means for sampling the detection signals with the clock signal both during scanning of the optically detectable areas and during scanning of the intermediate areas, detection means for identifying the samples as originating from either an optically detectable area or an intermediate area, signal-separating means for separating, under control of the detection means, the samples taken during scanning of the optically detectable areas and the samples taken during scanning of the intermediate areas.

The apparatus in accordance with the invention is further characterized in that the detection means are adapted to detect one sample per optically detectable area and one sample per intermediate area both for the samples from the first detection signal and the samples from the second detection signal, said clock signal having a frequency which is equal to or is a multiple of the bit frequency.

By selecting one sample each time the instantaneous sampling frequency after selection will vary in conformity with the instantaneous information-signal frequency, so that cross-talk of spectral components of said information signal into said selected samples is minimal.

The apparatus in accordance with the invention is further characterized in that the detection means are adapted to detect said one sample exclusively when the optically detectable areas and intermediate areas are longer than a predetermined number of clock periods.

This step ensures that the influence of the optical transfer function, i.e. the amplitude of the signal read as a function of the length of the optically detectable areas, on the selected samples is minimal.

A preferred embodiment of an apparatus in accordance with the invention is characterized in that the signal separating means comprise: first, second, third and fourth storage means, the samples derived from the first detection signal being applied to the first and the second storage means, the samples derived from the second detection signal being applied to the third and the fourth storage means, the first and the third storage means being switched on by the detection means only upon detection of said one sample if this sample originates from an intermediate area, and the second and the fourth storage means being switched on by the detection means only upon detection of said one sample if this sample originates from an optically detectable area.

A further characteristic feature of this preferred embodiment is that a first control signal is derived from the difference between the contents of the first and the third storage means and a second control signal is derived from the difference between the contents of the second and the fourth storage means, corrected as a function of the difference between the contents of the first and the third storage means.

For deriving said second control signal this apparatus may further be characterized in that the second control signal is derived in accordance with the formula:

$$(\bar{a} - \bar{b}) - \frac{\bar{a} + \bar{b}}{a + b}(a - b)$$

where $a$, $\bar{a}$, $b$ and $\bar{b}$ are the contents of the first, the second, the third and the fourth storage means respectively.

With respect to the detection means the preferred embodiment may be characterized in that the detection means comprise counting means which are started upon every transition between an optically detectable area and an intermediate area and which are arranged to count in the rhythm of the clock signal and to generate a control signal for the first and the third storage means when a predetermined count is reached while scanning an intermediate area and a control signal for the second and the fourth storage means when said predetermined count is reached while scanning an optically detectable area, the samples derived from the first and the second detection signal being applied to the storage means with a delay of a predetermined number of clock periods.

A preferred embodiment of the apparatus in accordance with the invention may further be characterized in that a third detection signal is derived from the sum of the amounts of light received by the two outer subdetectors, which third detection signal is sampled in the same way as the first and the second detection signal, the resulting samples being applied to fifth storage means which, in the same way as the first and the third storage means, are switched on by the detection means, and a focussing-error signal is derived in accordance with the formula $$a+b-2c$$

where a, b and c are the contents of the first, the third and the fifth storage means respectively.

BRIEF DESCRIPTION OF THE DRAWING

The invention will now be described in more detail, by way of example, with reference to the drawings, in which:

FIG. 2 shows an example of the detector 19 in the apparatus shown in FIG. 1,

FIG. 3 consisting of a through j shows some diagrams to explain the operation of the detector shown in FIG. 2.

DESCRIPTION OF THE PREFERRED EMBODIMENTS

Figure 1:
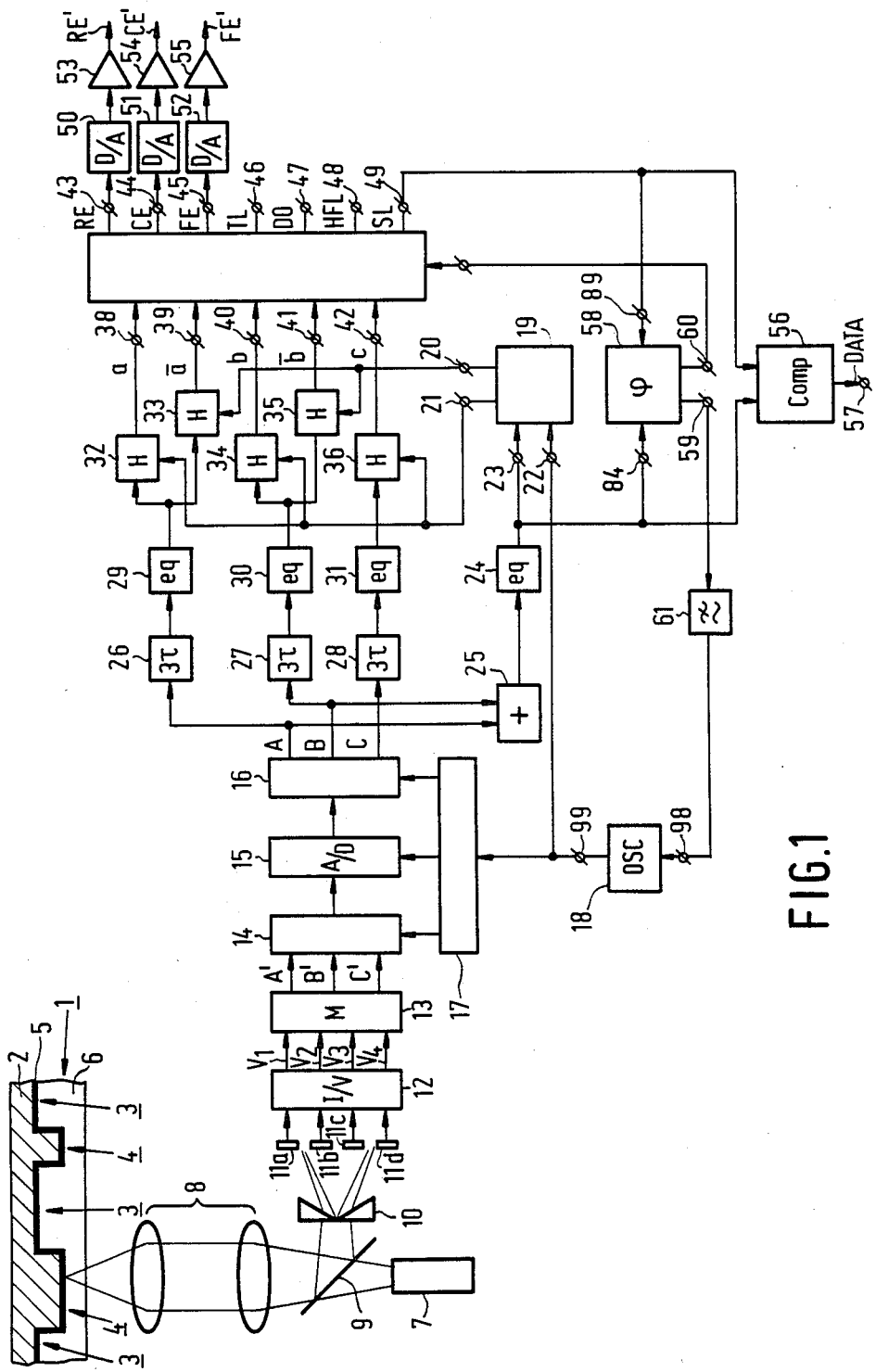
FIG. 1 is the block diagram of an embodiment of the invention.

FIG. 1 shows an apparatus in accordance with the invention.

In FIG. 1 a disc-shaped record carrier 1 is shown in a schematic cross-sectional view. This record carrier comprises a substrate 2 in which a track structure is formed, which structure comprises pits 3 and intermediate areas 4. This relief-type track structure is coated with a reflecting layer 5 and a transparent protective layer 6. The information contained in the relief-type track structure is read in that a laser beam generated by a laser 7 is projected and focused on the tracks via a lens system 8, the reflected beam being projected on an in-line array of four optical detectors 11a, 11b, 11c and 11d via a semi-transparent mirror 9 and a beam splitter 10. The currents supplied by these photodetectors are converted into the signal voltages $V_1$, $V_2$, $V_3$ and $V_4$ by means of a current-voltage converter 12.

For a correct read-out the focusing of the lens system 8 is controlled in a manner, not shown, by means of a focusing control signal FE'. For radial tracking the radial location of the spot produced by the laser beam is controlled by means of a radial control signal RE'. This is a fine-control system. Coarse control is obtained (in a manner not shown) by moving the entire optical system 7, 8, 9, 10, 11 in a radial direction under command of a control signal CE'.

The control signals CE', RE' and FE' are derived from the signal voltages $V_1$, $V_2$, $V_3$ and $V_4$. In addition to the sum $V_1+V_2+V_3+V_4$ required for recovering the high-frequency data signal, the signal $(V_1+V_4)-(V_2+V_3)$ is required for the signal FE' and the signal $(V_1+V_2)-(V_3+V_4)$ is required for the signal CE' and the signal RE'. All these control signals can be derived from three signals A', B' and C' which are obtained by combining the signals $V_1$, $V_2$, $V_3$ and $V_4$. In the present embodiment these signals are related as follows:

$$A' = V_1 + V_2$$

$$B' = V_3 + V_4$$

$$C' = V_1 + V_4$$

The combination of the signals $V_1$, $V_2$, $V_3$ and $V_4$ described in the foregoing is obtained by means of a matrix 13. This combination has the advantage that only three instead of four signals must be digitized, so that a local lower clock frequency is required than in the case that all of these signals are digitized serially. For this purpose the signals A', B' and C' are converted into serial form by means of a multiplexer 14, they are digitized in an analog-to-digital converter 15 and they are reconverted into parallel form to obtain the corresponding digital samples A, B and C by means of a demultiplexer 16. The multiplexer 14, the analog-to-digital converter 15 and the demultiplexer 16 receive clock signals from a clock-signal generating circuit 17, which supplies the required clock signals in the correct phase relationship under control of an oscillator 18, in such a manner that the samples A, B and C are supplied in synchronism with the bit frequency of the data signal.

For generating the various control signals it is important to suppress the data-signal spectrum as far as possible. This is achieved by selecting samples in synchronism with the data pattern (pits and intermediate areas), so that the instantaneous sampling frequency becomes equal to the instantaneous frequency of the data signal. For this purpose one sample for each pit (3) and for each intermediate area (4) is selected from each of the samples A, B and C and, in order to minimize the effect of the optical transfer function of the read-out (the signal amplitude is a function of the location of the projected laser beam relative to the pits and decreases towards the edges of the pits), the samples are taken only for pits and intermediate areas which are longer than a specific number of clock periods, in the present example longer than 5 clock periods. For this purpose a detector 19 (which will be described in more detail with reference to FIG. 2) generates a pulse on an output 20 when the sixth sample in one pit is detected and a pulse on output 21 when the sixth sample in one intermediate area is detected. The detector 19 receives the clock signals from the oscillator 18 on an input 22 and the digital sum of the signals A and B, obtained by means of the adder 25 and equalized by means of the circuit 24, on an input 23.

The samples A, B and C are each delayed by three clock periods ($\tau$) of the oscillator 18 by means of delay networks 26, 27 and 28 respectively, are equalized by means of the equalizers 29, 30 and 31 respectively, and are applied to the hold circuits 32 and 33, 34 and 35, and 36 respectively. The hold circuits 32, 34 and 36 are clocked by the signal on output 21 of the detector 19 and the hold circuits 33 and 34 by the signal on output 20. During each intermediate area longer than five periods the samples a, b and c of the samples A, B and C respectively than appear on the outputs 38, 40 and 42 respectively of the hold circuits 32, 34 and 36 respectively and during each pit which is longer than five clock periods the third samples ā and b̄ of the samples A and B respectively then appear on the outputs 39 and 41 respectively of the hold circuits 33 and 35 respectively.

It is to be noted that in principle it is also possible to base the sample selection on the length of the pits or intermediate areas, for example by taking the central sample in the case of long pits and intermediate areas.

The detection signals a, ā, b, b̄ and c are applied to a processing circuit 37 (which is described in more detail with reference to FIGS. 4, 6 and 13), which supplies the control signals RE, CE and FE on outputs 43, 44 and 45 respectively, a control signal TL representing a loss of track, a control signal DO indicating a signal drop-put, a control signal HFL indicating that the level of the high-frequency data signal is too low, and a control signal SL which is a decision level for the data-signal processing, on outputs 46, 47, 48 and 49, respectively. The digital control signals RE, CE and FE are converted into analog form by means of digital-to-analog converters 50, 51 and 52 and subsequently are amplified by the amplifier 53, 54 and 55 to form the analog control signals RE', CE' and FE' for focussing and tracking control.

Figure 4:
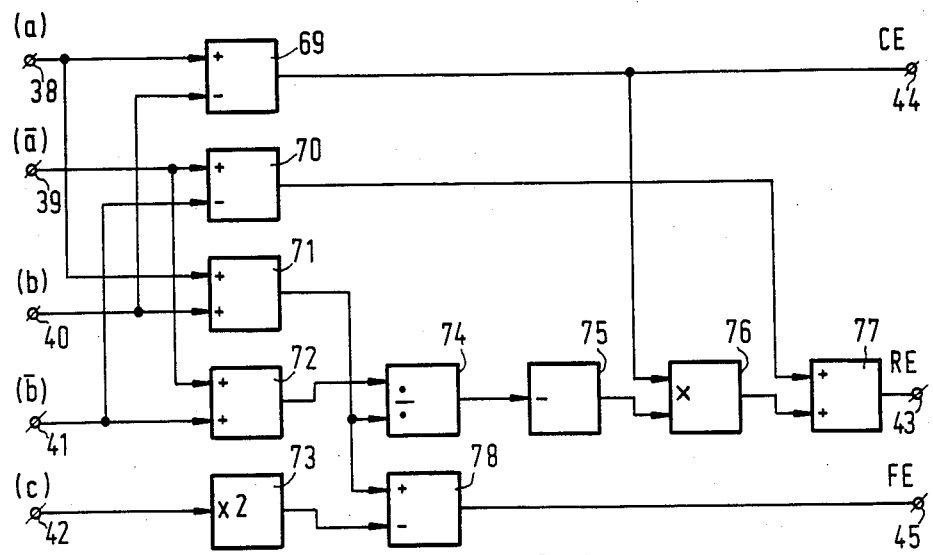
FIG. 4 shows an example of a part of the circuit 37 (FIG. 1) for generating the control signals RE, FE and CE.

The sum of the digital sample signals A+B formed by means of the adder 25 and the equalizer 24 is not only applied to the detector 19 but also to a comparator 56 which also receives the decision level signal SL for restoring lock digital sample signal and applying it to an output 57 and to a phase comparator circuit 58, which compares the phase of the samples A+B with the phase of the data signal on the record carrier 1 and which supplies a signal which is a measure of this phase difference to an output 59 and a signal which is a measure of the asymmetry of the signal A+B to an output 60, which last-mentioned signal is applied to a processing circuit 37, which will be described in more detail with reference to FIG. 4. The phase-error signal on output 59 controls the oscillator 18 via a low-pass filter 61.

FIG. 2 shows an example of the detector 19 in the apparatus shown in FIG. 1, and FIG. 3 shows some diagrams to explain the operation of the circuit shown in FIG. 2. In the circuit shown in FIG. 2 the signal A+B from the equalizer 24 is applied to a high-pass filter 62 via an input 23 in order to remove the low-frequency components, thereby enabling the digital data signal to be restored by means of a simple comparator 63. The edges of the rectangular data signal are detected by means of a circuit 64, for example a differentiator. This edge detector starts a counter 65 which counts the clock pulses (from the oscillator 18) on its input 22 from the instant defined by the pulses from the edge detector 64. A decoder circuit 66 decodes a specific count, in the present example six. When the count "six" is reached, the pulses are applied to AND-gates 67 and 68. The gate 67 also receives the restored data signal on an inverting input and the gate 68 receives this signal on a non-inverting input. As a result of this, a pulse will appear on output 21 when the count "six" is reached during a positive data signal (3c) and on output 20 when the count "six" is reached during a negative data signal.

To illustrate this, FIG. 3a shows a part of a data track on the record carrier, which track comprises pits 3 and intermediate areas 4 between these pits. FIG. 3b shows the samples A+B originating from the track shown in FIG. 3a. FIG. 3c shows the restored data signal after the comparator 63, which is a substantially rectangular signal with a period corresponding to the length of the pits and intermediate areas. FIG. 3d shows the starting pulses for the counter 65 formed on the edges of the data signal, which counter counts the pulses of the clock signal shown in FIG. 3e. The counter 65 supplies a pulse each time that the count "six" is reached and for a positive data signal (FIG. 3c), i.e. during an intermediate area, a pulse will appear on output 21 (FIG. 3f), whilst for a negative data signal, i.e. during a pit, the pulse will appear on output 20 (FIG. 3g). The signals A, B and C, which have been delayed by three clock periods, are thus sampled. FIG. 3h shows the signal A which has been delayed by three clock periods and for which the hold circuit 32 (FIG. 1) holds the third sample from each intermediate area longer than five clock periods (signal shown in FIG. 3i) and the sample and hold circuit 33 holds the third sample from each pit longer than five clock periods (signal shown in FIG. 3j).

FIG. 4 shows an example of that part of the processing circuit 37 (FIG. 1) which derives the control signals RE, CE and FE from the signal a, ā, b, b̄ and c.

The radial error signal RE can be obtained by taking the difference between the signals from the halves of the detector 11 (FIG. 1) disposed on each side of a tangential line of symmetry, i.e. 11a+11b+11c and 11d. This means that the signal A−B is required, namely at the location of the pits of the signal ā−b̄ after sampling during long pits only. As in the case of a displacement of the objective (8, 9) relative to the beam splitter 10 the light beam is not symmetrically incident on this beam splitter, differences will occur between the signals ā and b̄ which are not due to tracking errors. As this asymmetry also occurs during the intermediate areas it will also appear in the signal a−b. By adapting the signal a−b to the amplitude during the pits, i.e. by multiplying by (ā+b̄)/(a+b), which is the ratio between the signal amplitudes during the pits and during the intermediate areas, the influence of the asymmetry of the signal ā−b̄ can be determined. The corrected radial error signal is then:

$$RE = \bar{a} - \bar{b} - (a - b) \cdot \frac{(\bar{a} + \bar{b})}{(a + b)}$$

In the circuit shown in FIG. 4 this digital signal RE is obtained on an output 43 by forming the signals a−b and ā−b̄ with subtractor circuits 69 and 70, the signals a+b and ā+b̄ with adder circuits 71 and 72, the signal (ā+b̄)/(a+b) with divider 74, the signal −(ā+b̄)/(a+b) with inverter 75, the signal −(a−b)(ā+b̄)/(a+b) with multiplier 76, and finally the signal RE in conformity with the above relationship by means of adder 77.

The radial error signal RE is employed in order to ensure that the image of the laser beam exactly follows the track, for example by moving the lens system 8 in a radial direction, which gives rise to the aforementioned asymmetry.

A signal which is a measure of this asymmetry may therefore be employed for moving the entire optical system in a radial direction so as to minimize the oblique orientation as a result of the radial tracking. This signal CE is the signal a−b, which appears on the output of the subtractor circuit 69 and which is available at output 44 in FIG. 1. The signal CE in effect provides "coarse control", whilst the signals RE provides "fine control".

A correction signal FE for the focusing of the laser beam on the intermediate areas may be derived from the difference between the radiation detected by the detectors 11a, 11d and 11b, 11c during the intermediate areas. This signal, which is obtained in analog form as the signal $(V_2+V_3)-(V_1+V_4)$ during the intermediate areas is as follows expressed in samples a, b and c:

$$FE = a + b - 2c.$$

In the circuit shown in FIG. 4 the signal FE is obtained on output 45 by doubling the signal c on input 42 by multiplier 73 and subsequently subtracting it from the signal a+b on the output of adder 71 by means of subtractor circuit 78.

Figure 5:
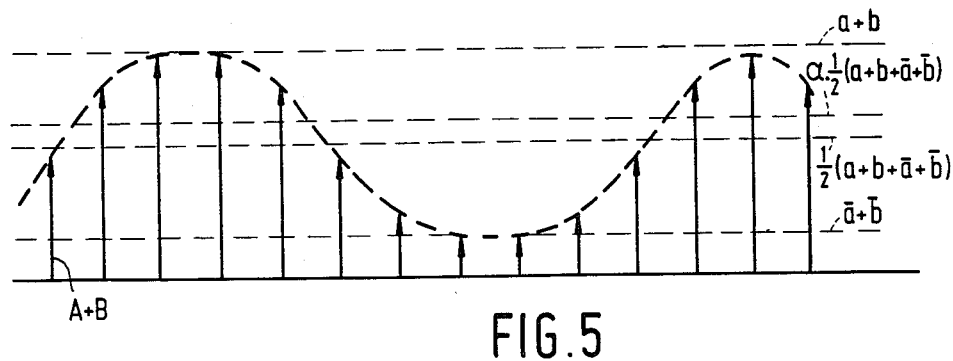
FIG. 5 is a diagram to explain the operation of the circuit shown in FIG. 6.

In the apparatus shown in FIG. 1 the data signal A+B is applied to a comparator 56 for restoring the data signal. In this comparator the samples A+B are compared with a decision level SL appearing on output 49 of the circuit 37. This decision level SL should be such that the restored data signal is exactly corresponds to the pattern of pits on the disc. As is shown in FIG. 5, the signal A+B varies between the levels a+b and $\overline{a+b}$, which are the values of the signal A+B during the third sample of long mirrorrs and intermediate areas respectively. A first approach adopted for a decision level SL is halfway between said levels a+b and $\overline{a+b}$, so:

$$SL = \tfrac{1}{2}(a+b+\overline{a}+\overline{b}).$$

This approach is correct only if the signal A+B is symmetrical as regards its variation during the intermediate areas or pits, which is not always the case. Therefore, the level must be corrected by a factor $\alpha$ which is a measure of the asymmetry of the signal A+B. For generating this factor $\alpha$ reference is made to FIGS. 7 and 8.

Figure 6:
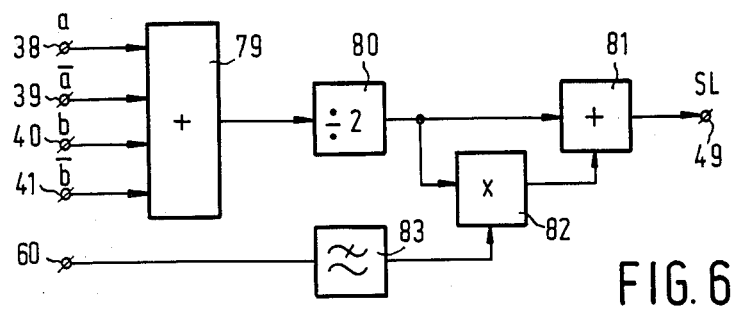
FIG. 6 shows an example of that part of the circuit 37 (FIG. 1) which supplies the signal SL.

FIG. 6 shows an example of that part of the circuit 37 which generates the decision level SL. By means of an adder 77 the sum of the samples a, $\overline{a}$, b and $\overline{b}$ is determined and this sum is halved by the divider 80. The resulting value $\tfrac{1}{2}$ (a+$\overline{a}$+b+$\overline{b}$) must be multiplied by a factor $\alpha$ in order to correct for asymmetries. However, multiplying by said factor $\alpha$ means that a fast multiplier must be used in order to cope with comparatively rapid variations of $\tfrac{1}{2}$ (a+b+$\overline{a}$+$\overline{b}$). It is more effective to multiply by a factor $\alpha = (1+e)$ instead of by the factor $\alpha$, which means that a fraction of the output signal of the divide-by-two circuit 80 must be added to said output signal by means of the adder 81. This fraction e is obtained by means of the multiplier 82. Via a low-pass filter 83 the factor e is derived from a signal on the output 60 of the phase comparator 58 (FIG. 1). This has the advantage that the multiplier 82 need not be fast, because the factor e varies comparatively slowly in comparison with the value $\tfrac{1}{2}$ (a+b+$\overline{a}$+$\overline{b}$). Another advantage of this solution is that when the levels a+b and $\overline{a+b}$ after one long pit and one long intermediate area are known after the control system has become operative a reasonably reliable decision level SL=$\tfrac{1}{2}$ (a+b+$\overline{a}$+$\overline{b}$) will appear on output 49 even before the correction factor e is known.

Figure 7:
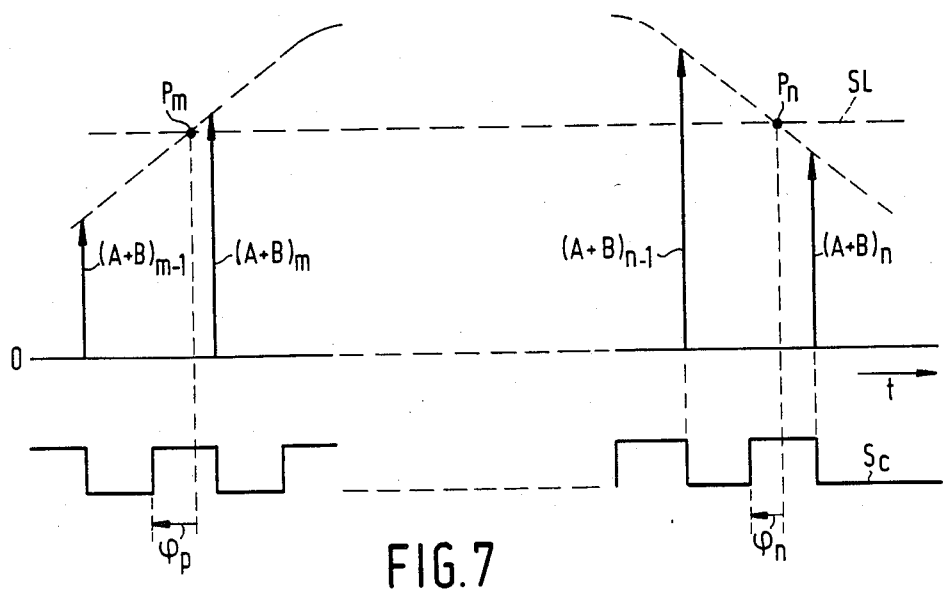
FIG. 7 is a diagram to explain the operation of the circuit shown in FIG. 8.
Figure 8:
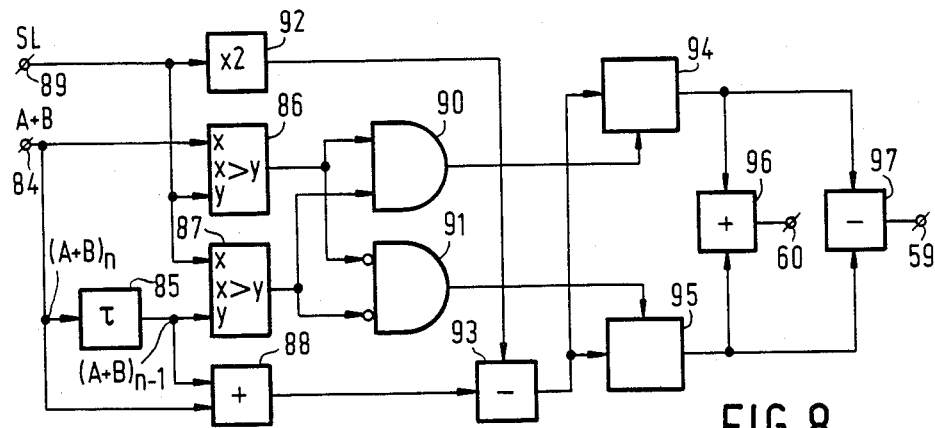
FIG. 8 shows an example of the phase detector 58 (FIG. 1)

FIG. 8 shows an example of the circuit 58 (FIG. 1) for generating a signal which is a measure of the phase error of the clock signal relative to the data recorded on the disc and a signal which is a measure of the asymmetry of the signal A+B and which must be applied to the circuit shown in FIG. 6 for correcting the decision level SL. The operation of the circuit shown in FIG. 8 will be described with reference to FIG. 7, in which $(A+B)_{n-1}$ and $(A+B)_n$ are two consecutive samples of the signal A+B situated on different sides of the decision level SL. Assuming that the anlog signal, of which $(A+B)_{n-1}$ and $(A+B)_n$ are two samples, varies linearly between these samples, the point of intersection $P_n$ with said decision level can be determined by linear interpolation.

The relative deviation of this intersection $P_n$ relative to an instant which is situated exactly halfway between the instants at which the samples $(A+B)_{n-1}$ and $(A+B)_n$ appear is then a measure of the instantaneous phase difference between the clock signal with which the instants at which the samples $(A+B)_n$ and $(A+B)_{n-1}$ are synchronized and the edges of the pits 3, and consequently of the instantaneous phase difference with the belt frequency of the recorded data signal. In FIG. 7 this clock signal bears the reference $S_C$ and the phase difference bears the reference $Q_n$. For the intersection $P_n$ with the decision level SL between the samples $(A+B)_m$ and $(A+B)_{m-1}$ corresponding to the other edges of the pits 3 an instantaneous phase difference $Q_p$ can be determined in the same way.

The sum $Q_p+Q_n$ is now a measure of the average phase deviation of the two edges and is consequently a measure of the phase error of the clock oscillator 18, whilst the difference between the phase errors $Q_p$ and $Q_n$ is a deviation of the decision level SL from the desired level. Instead, if the level SL rises, $Q_p$ increases and $Q_n$ decreases, so that the difference $Q_p-Q_n$ increases in a positive sense. If the level SL decreases below the desired level, this difference $Q_p-Q_n$ becomes negative.

Therefore, the difference $Q_p-Q_n$ is a measure of the correction factor e for the circuit shown in FIG. 6. The phase difference $Q_n$ and $Q_p$ can be determined as follows by linear interpollation:

$$aQ_n = (A+B)_{n-1} + (A+B)_n - 2SL, \text{ and}$$

$$-aQ_p = (A+B)_{m-1} + (A+B)_m - 2SL$$

where a is a factor which depends on the slope of the interpolation line and which is therefore proportional to the amplitude of the data signal being read. The desired signals are generated by means of the circuit shown in FIG. 8. The samples A+B are applied to an input 84 which is connected to a device 85 which delays the sample by one clock period $\tau$, so that the samples $A+B_m$ and $A+B_{m-1}$ appear on the input and the output respectively of said device in the case of an intersection of the level SL during a positive edge, and the samples $(A+B)_n$ and $(A+B)_{n-1}$ in the case of an intersection during a negative edge. The decision level generated by the circuit shown in FIG. 6 is applied to an input 89. This decision level SL together with the signal on input 84 is applied to a comparator 86, which produces an output signal when the signal on input 84 exceeds the decision level SL, and together with the delayed signal on the output of the delay network 85 the decision level is applied to a comparator 87 which produces an output signal when the decision level SL is higher than the signal on the output of the delay network 85. The output signals of the two comparators 86 and 87 are applied to an AND-gate 90 and a NAND-gate 91 so that the AND-gate 90 produces a signal in the case of an intersection of the decision level SL during a positive edge and the NAND-gate 91 produces an output when the decision level SL is intersected during a negative edge. By means of an adder 88 the signals obtained on both sides of the delay element 85 are added to each other and subsequently twice the decision level SL, which is obtained by means of the multiplier 92, is subtracted therefrom by means of a subtractor circuit 93. The result is sampled by a hold circuit 94 under command of the gate 90 and by a hold circuit 95 on command of the gate 91, so that the signal on the output of the hold circuit 94 is equal to a $Q_n$ and the signal on the output of the circuit 95 is equal to $-aQ_p$. These signals are subtracted by means of a subtractor circuit 97, so that on the output 59 of this circuit a signal equal to $a(Q_n+Q_p)$ appears, which is the desired signal which is a measure of the phase error of the clock 18, with which signal the oscillator 18 is corrected via the low-pass filter 61 in order to ensure that the clock signal has a fixed phase relationship with the recorded data signal. The signals on the outputs of the two hold circuits are added by the adder 96, so that an output 60 of this adder a signal equal to $a(Q_n-Q_p)$ appears, which is the signal which is a measure of the asymmetry. This signal is applied to a device for generating the threshold level (FIG. 6), so that a control loop is obtained which controls the height of the threshold level in such a manner that the signal $a(Q_n-Q_p)$ goes to zero or the phase difference $Q_n$(FIG. 7) becomes equal to the phase difference $Q_p$.

The signals appearing on outputs 59 and 60 are proportional to the amplitude of the signal A+B. This has the advantage that during signal drop-outs the generated signals become zero, so that the oscillator 18 and device shown in FIG. 6 will receive no signal instead of a comparatively large spurious signal, which often happens in the customary phase detectors.

In practice it is found that the clock frequency which is locked to the edges of the data signal on the disc is not very stable, but exhibits a variation (jitter) of approximately 50 nsecs. The clock oscillator 18 (FIG. 1) must be capable of accurately keeping in track with this jitter; in practice a tracking accuracy of 10 to 15 nsecs. (for a period of ±200 nsecs) is found to be adequate.

Figure 9:
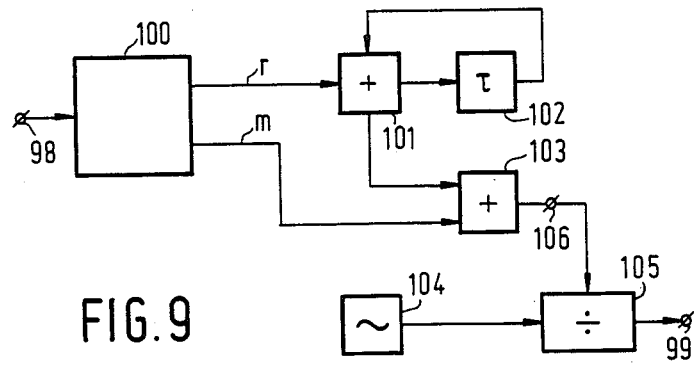
FIG. 9 shows an example of the oscillator 18 (FIG. 1)

FIG. 9 shows an example of an oscillator circuit 18 having this tracking accuracy. The phase-error signal from the low-pass filter 61 is divided into m steps by means of the rounding circuit 100, which steps correspond to the tracking accuracy of 10 to 15 nsecs. (one step of 10 nsecs for a clock signal with a period of 200 nsecs. corresponds to a phase difference of 18°). The remainder r of the division is applied to an adder 101, which is arranged as an accumulator by means of a feedback loop via a delay network 102 with a delay of one clock period $\tau$ (=200 nsecs.) so that the rounding errors r are accumulated. Each time when the accumulator has stored one complete step, the adder 103 adds this step to the output signal m of the rounding circuit 100. The output signal of this adder 103, i.e. the rounded phase error, controls the divisor of a variable divider 105, which divides the output signal of a fixed oscillator 104. As a step of 10 nsecs. for a desired clock signal with a period of approximately 200 nsecs. corresponds to 1/20 of the period of this clock signal, a signal may be used with a frequency of approximately 100 MHz and a divisor which can be varied around the value 20. On the output 99 of the divider a clock signal is obtained with a period of the order of 200 nsecs. (±5 MHz), which is variable in steps of approximately 10 nsecs.

Figure 10:
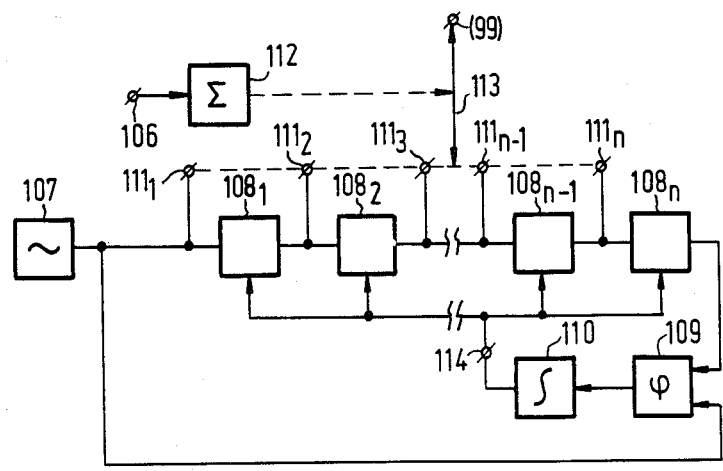
FIG. 10 is a modification to a part of the oscillator shown in FIG. 9.

A modification to the circuit of FIG. 9 will be described with reference to FIG. 10. In this circuit an input 106 receives the phase-error signal which has been rounded in steps (from the adder 103 in the circuit shown in FIG. 9).

The circuit comprises a fixed oscillator 107 which is tuned to approximately the desired frequency (nominal 4.31 MHz). The utput signal of this oscillator is passed through n delay networks $108_1$ to $108_n$, which each have a delay equal to the desired step size, i.e. 10 to 15 nsecs. The overall delay of the n networks must correspond to one period of the clock signal, for which purpose the output signal of the last network $108_n$ is compared with the output signal of the oscillator 107 by means of a phase comparator 109. The output signal of the phase comparator 109 controls the delay time of the networks 108 via an integrator 110, so that together these networks provide a delay of exactly one period of the clock signal. For the delay networks 108 tappings $111_1$ to $111_n$ are provided. The rounded phase-error signal on input 106 is applied to an accumulator 112, which via a multiplexer 113 connects output 99 to one of the tappings 111 depending on the contents of this accumulator. After every n counting steps the accumulator 112 is reset to its initial state. Therefore, it is advantageous to select n=16, so that a four-bit counter may be used.

Depending on the magnitude of the phase error one of the tappings 111 is selected via the accumulator 112. In the case of a progressive phase difference (i.e. an inequality between the desired clock frequency on output 99 and the frequency of the oscillator 107) output 99 will scan the tappings 111 via the multiplexer 113 depending on the phase error and consequently on the frequency difference and steps start again after every n, which will not give rise to a discontinuity because n steps exactly correspond to one period of the output signal. The phase and frequency of the signal on output 99 is consequently the result of phase modulation of the signal from oscillator 107, which phase modulation is effected in discrete steps of 360/n°.

Figure 11:
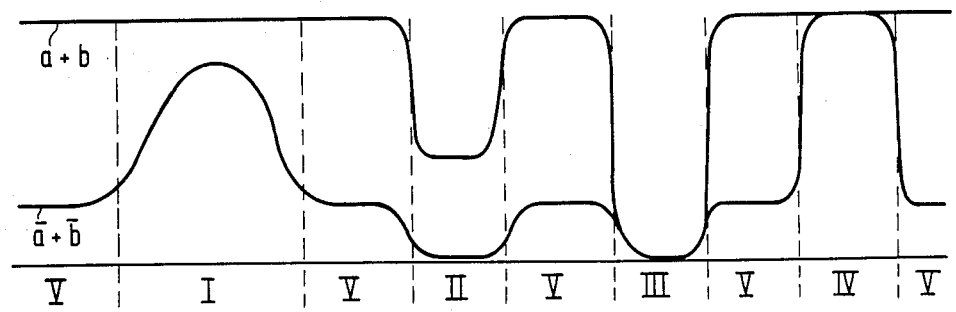
FIG. 11 is a diagram to explain the operation of the circuit shown in FIG. 12.
Figure 12:
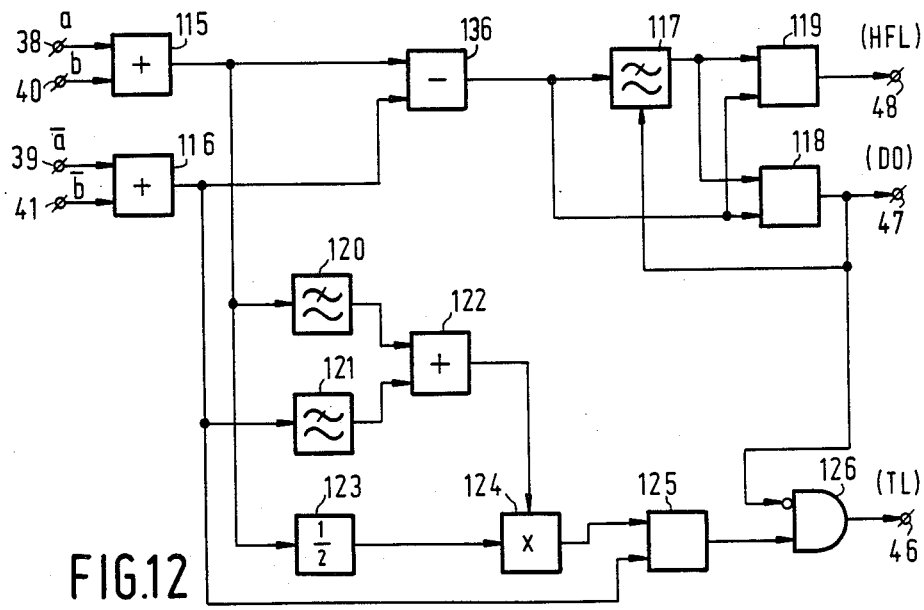
FIG. 12 is an example of that part of the circuit 37 (FIG. 1) which supplies the signals TL, DO and HFL.

FIG. 12 shows an example of that part of the circuit 37 (FIG. 1) which supplies the signals TL, DO and HFL, FIG. 11 illustrating some faults which may occur during the reproduction of the data from a disc. The variation of the signals a+b (the sum of the samples a and b taken during long intermediate areas) and $\bar{a}+\bar{b}$ (the sum of the samples $\bar{a}$ and $\bar{b}$ taken during long pits) is plotted in FIG. 11. The ranges V represent the values of the signals during undisturbed reproduction. In the range I loss of track occurs. The signal a+b produced by the intermediate areas does not vary, whilst the signal $\bar{a}+\bar{b}$ increases substantially because more light is reflected from the lands between the tracks. In range II a finger mark occurs. The reflection from both the pits and intermediate areas decreases and both signals have become smaller. In range III a "black" signal drop-out occurs, so that neither the intermediate areas nor the pits reflect any light and consequently both the signal a+b and the signal $\bar{a}+\bar{b}$ become zero. Such a signal drop-out may for example occur if the reflecting layer 5 of the disc is missing locally. In range IV a "white" signal drop-out occurs, the signal $\bar{a}+\bar{b}$ then becoming equal to the signal a+b, which for example occurs in the case of the local absence of pits on the disc.

A suitable criterion for determining a signal drop-out is the criterion that the high-frequency signal amplitude, i.e. the difference between the signal at the location of an intermediate area and at location of a pit or, if limited to samples during long pits and intermediate areas, the signal $(a+b)-(\bar{a}+\bar{b})$ decreases to a specific extent. In the circuit shown in FIG. 12 the adder 115 therefore determines the sum of signals a and b and the adder 116 determines the sum of the signals $\bar{a}$ and $\bar{b}$, whilst the subtractor circuit 116 forms the difference signal $(a+b)-(\bar{a}+\bar{b})$. In order to detect the decrease of this signal a low-pass filter 117 determines the average of this signal, which average is compared with the instantaneous value of the signal in the comparator 116. If this instantaneous value is, for example, less than 15% of the average value, a signal (DO) is supplied to the output 47. In addition, a comparator 119 determines whether the instantaneous signal $(a+b)-(\bar{a}+\bar{b})$ is smaller than for example 50% of the averahe value and, if this is the case, a signal (HFL) is produced on output 48 as a sign that the data signal has dropped out. Thus, this signal HFL is not only produced during a signal drop-out (situations III and IV in FIG. 11) but for example also in the case of finger marks (situation III) and loss of track (situation I).

As, for example in the case of finger marks, the disturbance may be less serious, the time constant of the filter 117 is comparatively small so that the average $(a+b)-(\bar{a}+\bar{b})$ decreases relatively fast in the case of, for example, finger marks (situation II) and the signal HFL will disappear in the case of prolonged disturbances. In the case of signal drop-outs as in the situations Ii and IV this is not permissible. Therefore, the signal DO switches the time constant of the filter 117 to a substantially higher value during such faults. During faults for which the signal decreases to a level between 15 and 50% of the undisturbed level, the filter 117 operates with a small time constant and during faults for which the signal decreases to a level below 15% it operates with a large time constant.

In order to detect loss of track it is ascertained whether the signal during the pits $(a+b)$ is larger than a specific fraction $\alpha$ (for example $\alpha=0.5$) of the signal during the intermediate errors $(a+b)$, or:

$$\bar{a}+\bar{b} > \alpha(a+b).$$

However, since in particular the magnitude of the signal $(a+b)$ in the pits depends on the disc quality and these signals also depend on, for example, the laser intensity, it is necessary, in order to make the detector independent of these parameters, that the factor $\alpha$ depends on these parameters by making it dependent on the modulation factor. This modulation factor is, for example, the average of the average value of the signal $\bar{a}+\bar{b}$ and the average value of the signal $a+b$. In the apparatus shown in FIG. 12 the signal $a+b$ and $\bar{a}+\bar{b}$ on the outputs of the adders 115 and 116 respectively are therefore averaged with low-pass filters 120 and 121 respectively and the sum of the averages is taken by means of the summing device 122. The signal $a+b$ on the output of the adder 115 is halved by the divider 123 and subsequently multiplied by the output signal of the divider 122 in the multiplier 124. The output signal of this multiplier 124 is compared with the output signal $\bar{a}+\bar{b}$ of the adder 116 in the comparator 125, thus yielding an output signal in conformity with the aforementioned criterion $\bar{a}+\bar{b} > \alpha(a+b)$, where $\alpha = \frac{1}{2} \times \{\text{average of }(\bar{a}+\bar{b}) + \text{average}(a+b)\}$. Since this criterion is also valid for signal drop-outs in accordance with situation IV, this signal is combined with the inverse of the signal DO in an AND-gate 126, so that on output 46 a signal TL appears which is indicative of situation I only.

What is claimed is:

1. An improved apparatus for reproducing information from an optically readable record carrier on which digital information is stored in the form of a track of optically detectable areas which alternate with intermediate areas, each such area representing data bits occurring at a predetermined bit frequency, which apparatus comprises:

an optical system for projecting a light beam which produces a spot of light on the record carrier and which is reflected therefrom;

at least two optical detectors which are so arranged in the beam of light reflected from the record carrier that in the case of correct tracking the two detectors are disposed symmetrically with respect to the reflected image of the track and thereby detect equal amounts of the reflected light;

a signal-generating circuit for generating at least a first and a second detection signal respectively representative of the amounts of light detected by the two optical detectors; and a control-signal generator for generating from said detection signals at least one control signal which is a measure of the position relative to said track of the spot of light produced thereon by said light beam; said improvement being characterized in that said control-signal generator comprises:

oscillator means for supplying a clock signal;

an analog-to-digital converter which is clocked by the clock signal and samples the detection signals in synchronism therewith during scanning of optically detectable areas of said track and during scanning of intermediate areas of said track;

detection means coupled to said analog-to-digital converter for identifying the sampled detection signals which originate from optically detectable areas of said track and the sampled detection signals which originate from intermediate areas of said track; and signal-separating means coupled to said detection means for separating the sampled detection signals originating from optically detectable areas of said track from those originating from intermediate areas of said track.

2. An improved apparatus as claimed in claim 1, further characterized in that the detection means is adapted to identify only one sampled detection signal for each optically detectable area of said track and only one sampled detection signal for each intermediate area of said track; and said clock signal has a frequency which is equal to or is a multiple of said bit frequency.

3. An improved apparatus as claimed in claim 2, in which the sampled detection signals identified by said detection means respectively originate from optically detectable areas and intermediate areas of said track which are longer than a predetermined number of periods of said clock signal.

4. An improved apparatus as claimed in claim 3, further characterized in that the signal separating means comprises: first, second, third and fourth storage means coupled to said analog-to-digital converter, the samples derived by said converter from the first detection signal being applied to the first and the second storage means, and the samples derived by said converter from the second detection signal being applied to the third and the fourth storage means; the first and the third storage means being gated by the detection means upon identification of said one detection signal sample originating from an intermediate area of said track, and the second and the fourth storage means being gated by the detection means upon identification of said one detection signal sample originating from an optically detectable area of said track.

5. An improved apparatus as claimed in claim 4, further characterized in that said control signal generator further comprises a processing circuit coupled to said signal-separating means and which is adapted to derive a first control signal from the difference between the contents of the first and the third storage means and a second control signal from the difference between the contents of the second and fourth storage means, which last-mentioned difference is corrected as a function of the first-mentioned difference.

6. An improved apparatus as claimed in claim 5, further characterized in that said processing circuit derives the second control signal in accordance with the formula:

$$(\bar{a} - \bar{b}) - \frac{\bar{a} + \bar{b}}{a + b}(a - b)$$

where $\bar{a}$, b and $\bar{b}$ are the contents of the first, the second, the third and the fourth storage means respectively.

7. An improved apparatus as claimed in claim 4, further characterized in that the detection means comprises counting means which begins counting in synchronism with said clock signal upon every transition between detection signal samples from optically detectable and intermediate areas of said track, such counting means generating a first gating signal for gating the first and the third storage means when a predetermined count is reached after transition to an intermediate area of said track, and generating a second gating signal for gating the second and the fourth storage means when said predetermined count is reached after transition to an optically detectable area of said track; and wherein the first and the second detection signal samples are delayed a predetermined number of clock periods before being applied to any of said storage means.

8. An improved apparatus as claimed in claim 4, wherein each of said two optical detectors comprises two sub-detectors and said signal-generating circuit generates a third detection signal from the sum of the amounts of light received by the two sub-detectors furthest from the center of said track; further characterized in that said analog-to-digital converter samples said third detection signal, in synchronism with said clock signal; the signal separating means comprises fifth storage means to which the sampled third detection signal is applied; and said control-signal grater further comprises a processing circuit coupled to said signal-separating means and which is adapted to derive a focusing-error signal in accordance with the formula:

$$a+b-2c$$

where a, b and c are the contents of the first, the third and the fifth storage means respectively.

9. An improved apparatus as claimed in claim 1, wherein said control-signal generator further comprises a processing circuit coupled to said signal-separating means and which is adapted to derive a first control signal from the difference between samples of the two detection signals originating from intermediate areas of said track and a second control signal from the difference between samples of the two detection signals originating from optically detectable areas of said track, which last-mentioned difference is corrected as a function of the first-mentioned difference.

* * * * *